Figure 1:
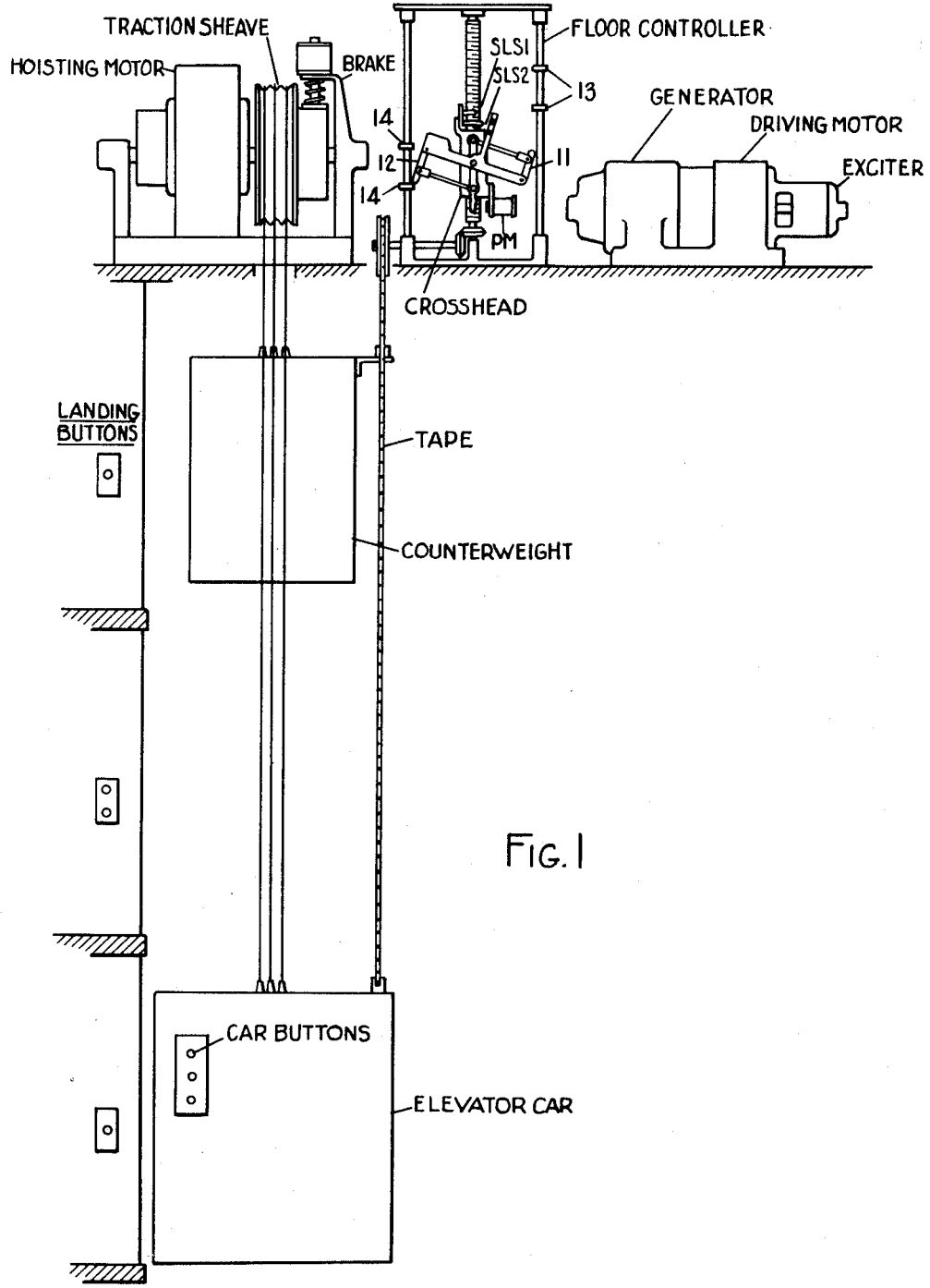

Nov. 21, 1950  A. W. PAULSON  2,530,398
GENERATOR CONTROL SYSTEM
Filed April 11, 1947  5 Sheets-Sheet 4

Arthur Willard Paulson INVENTOR

BY Matthew T. Bradley  ATTORNEY

Nov. 21, 1950     A. W. PAULSON     2,530,398
GENERATOR CONTROL SYSTEM

Filed April 11, 1947     5 Sheets-Sheet 5

Arthur Willard Paulson    INVENTOR

BY    ATTORNEY

Patented Nov. 21, 1950

2,530,398

UNITED STATES PATENT OFFICE 2,530,398

GENERATOR CONTROL SYSTEM

Arthur Willard Paulson, Summit, N. J., assignor to Otis Elevator Company, New York, N. Y., a corporation of New Jersey Application April 11, 1947, Serial No. 740,735

12 Claims. (Cl. 318—140)

The invention relates to the control of direct current generators, particularly where such generators are employed to supply current to direct current motors at variable voltage.

There are certain advantages in using a direct current generator having a self-excited field winding in addition to a separately excited field winding, particularly where the generator is employed to supply current at a variable voltage to a direct current motor. There is also advantage, especially where the motor serves as a hoisting motor in an elevator installation, in using a generator having a series field winding for load compensation. Under overhauling load conditions, the direction of current through the series field winding is such as to provide excitation for a polarity of generator voltage opposite to that desired. It is important in such cases that the self-excited field winding excite the generator for the desired polarity of generator voltage.

It is an object of the invention to prevent the building up by the self-excited field winding of a generator voltage of a polarity opposite to that desired.

Another object of the invention is to cause the self-excited field winding to act, should the polarity of generator voltage become reversed, to build down the generator voltage.

The invention involves connecting the self-excited field winding in circuit with unidirectional current conducting means so that current flow in the winding is in a direction to provide excitation for generator voltage of opposite polarity to that desired is prevented.

In the arrangement which will be described, the unidirectional current conducting means are in the form of rectifiers and are arranged to pass current through the self-excited field winding only in the direction for the desired polarity of excitation. To provide this desired polarity of excitation regardless of whether the generator voltage is of the desired polarity or not, the rectifiers are arranged in a bridge circuit with the self-excited field winding connected across the diagonal of the bridge. The invention will be described as applied to an elevator system. In such systems, direction switches are provided and are operated in accordance with the direction of car travel desired. To enable the self-excited field winding to provide the desired polarity of excitation for both directions of car travel, the direction switches are arranged to control the direction of current flow across the diagonal of the bridge. A fuse is arranged in the self-excited field winding circuit and acts to disconnect this circuit when a rectifier becomes short-circuited and current flows in a direction in which the rectifier normally blocks the flow of current.

It is desirable, especially in elevator installations, when the generator external excitation is discontinued, as when the elevator hoisting motor is brought to a stop, to reduce to a minimum the generator voltage due to the residual flux of the generator field. In accordance with the invention, this is effected by connecting the self-excited field winding to the generator armature so that the current flow through the winding is reversed.

The mode of carrying out the invention which is at present preferred and the various features and advantages thereof will be gained from the above statements and the following description and appended claims.

Figure 2:
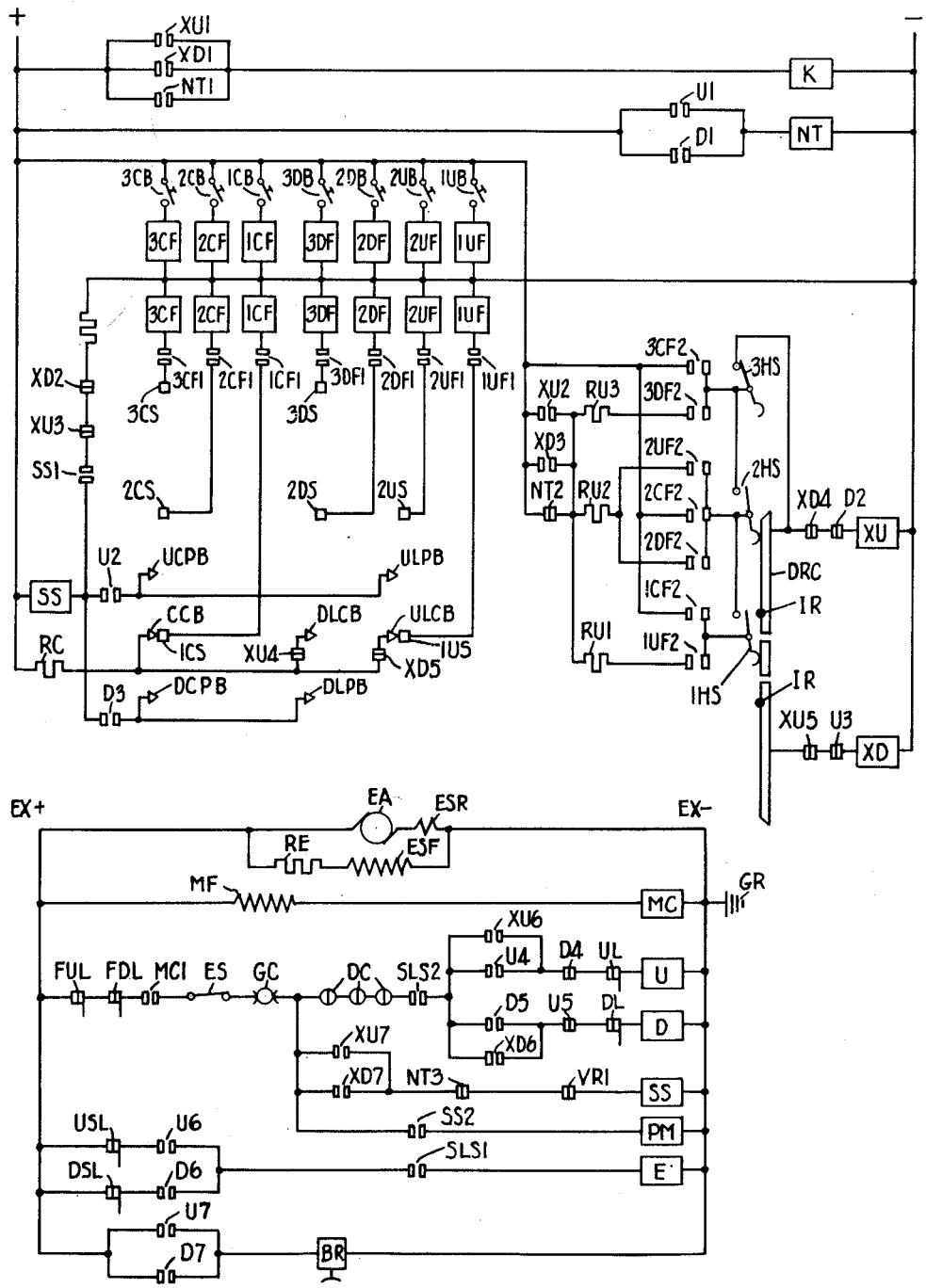
Figure 2S:
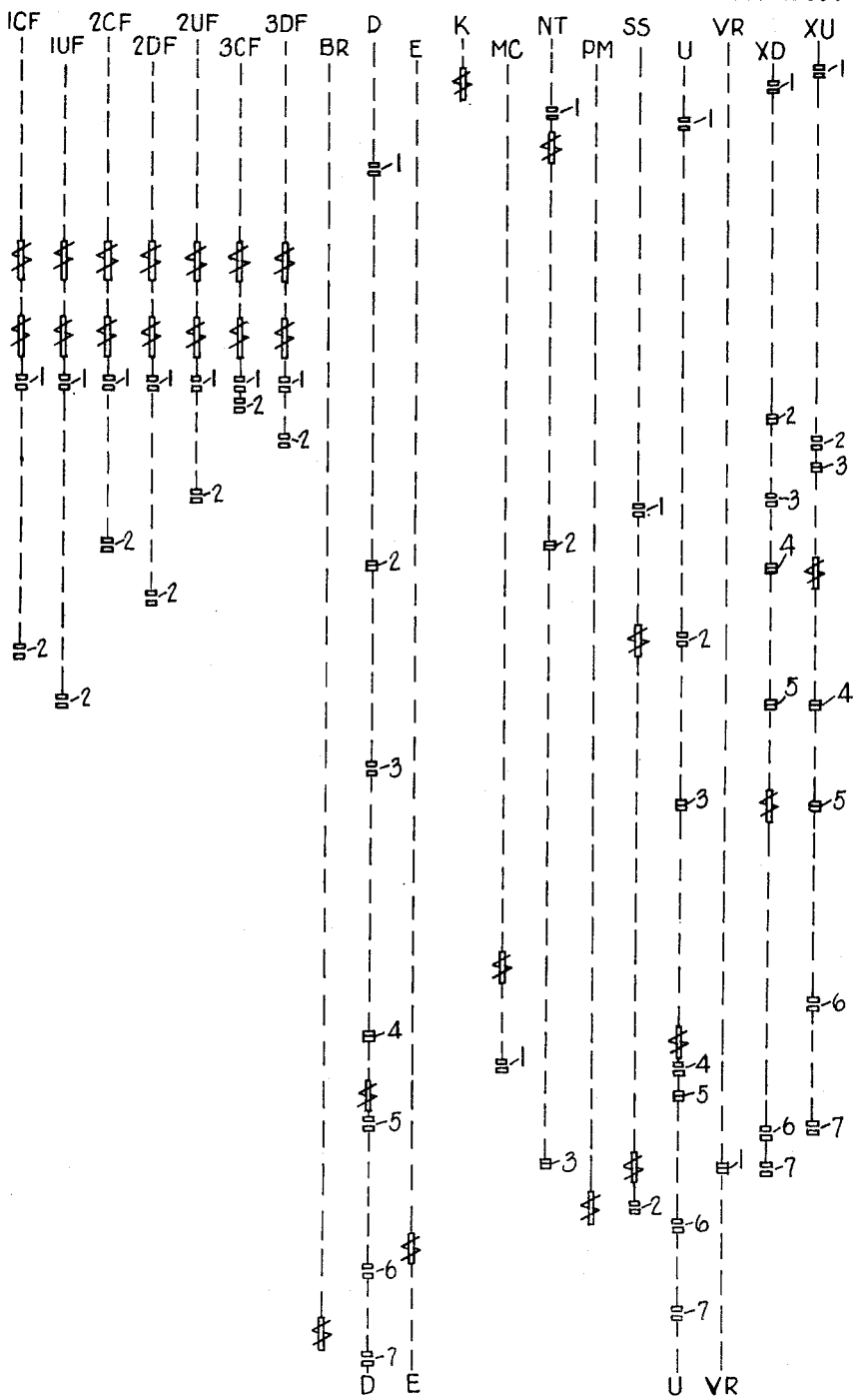
Figure 3:
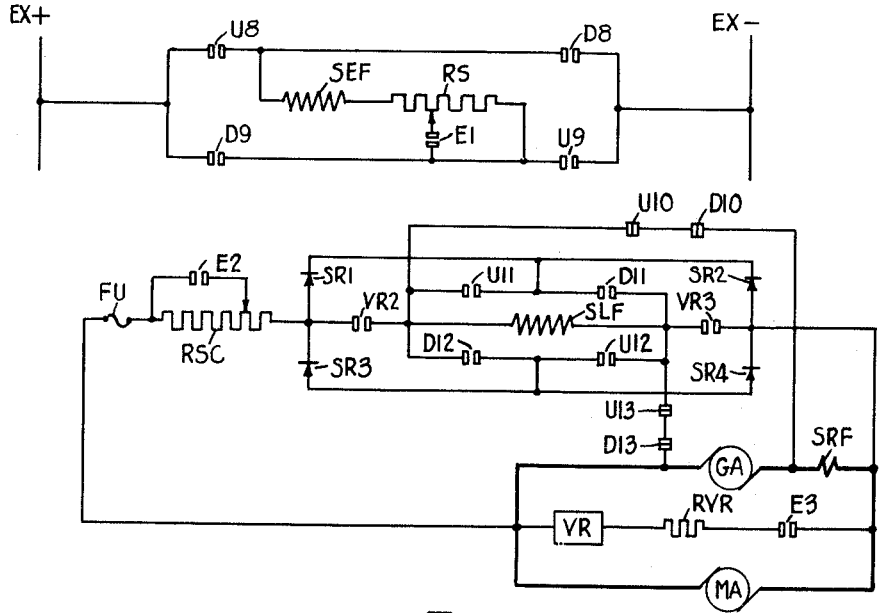
Figure 4:
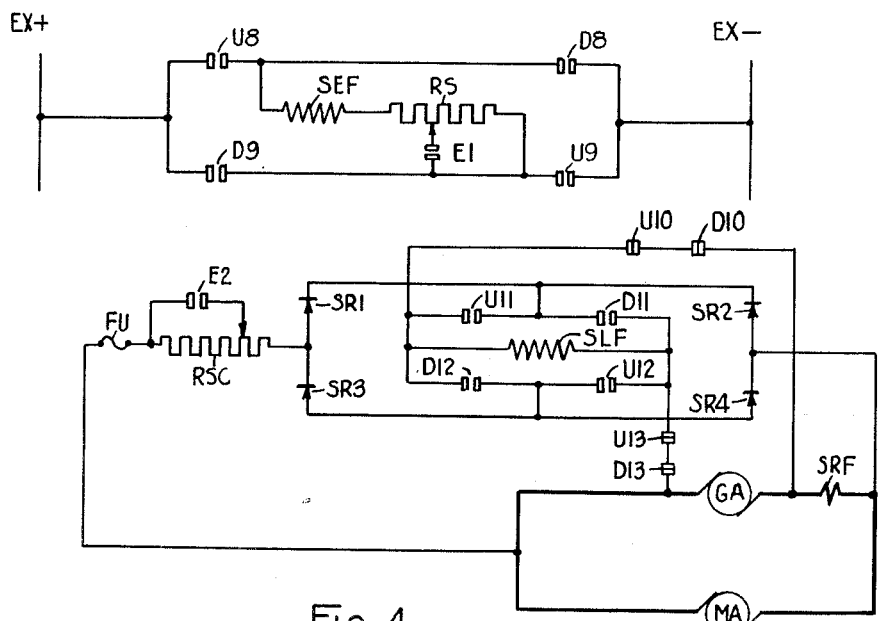
Figure 3S:
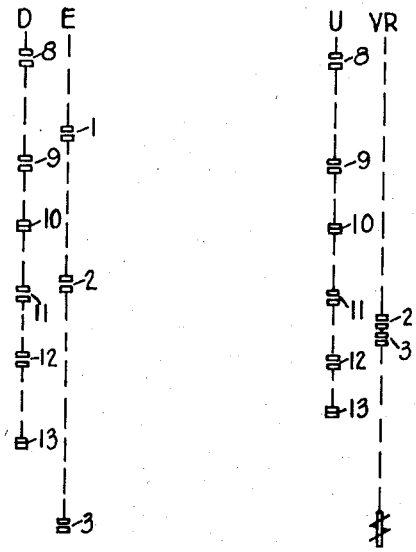
Figure 4S:
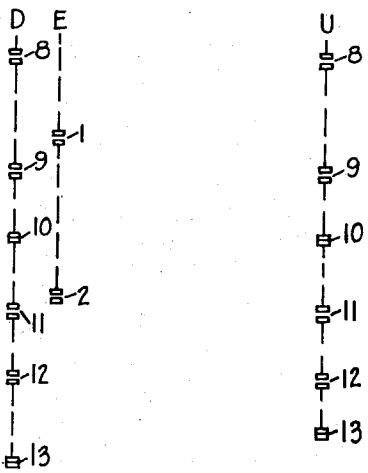

In the drawings:

Figure 1 is a simplified schematic representation of an elevator installation to which the invention is applicable;

Figures 2 and 3 constitute a simplified wiring diagram in "across-the-line" form of an elevator control system chosen to illustrate the invention and suitable for the installation of Figure 1;

Figure 4 is a view similar to Figure 3 of a modified arrangement of certain of the generator circuits; and Figures 2s, 3s and 4s are key sheets for Figures 2, 3 and 4 respectively showing the electromagnetic switches in spindle form with the contacts and coils arranged on the spindles in horizontal alignment with the corresponding contacts and coils in the wiring diagrams.

For a general understanding of the invention, reference may be had to Figure 1, wherein various parts of the system are indicated by legend. The car is raised and lowered by means of the hoisting motor, which drives a traction sheave over which pass hoisting ropes for the car and counterweight. An electromechanical brake is provided and is applied in stopping the car and holding the car when at rest. Current is supplied to the hoisting motor by the generator of a motor generator set. An exciter is also provided and is illustrated as driven by the driving motor of the motor generator set.

For illustrating the principles of the invention, a type of elevator control system has been illustrated which is known as collective control. The pressing of a push button either in the car or at a landing starts the car in a direction toward the floor for which the push button is provided. The car is slowed down and stopped at landings for which push buttons have been pressed, the car being automatically restarted after each stop so long as push buttons remain to be responded to.

An installation of only three floors is illustrated. A push button is provided in the car for each of the floors. Also an up push button and a down push button are provided at the second floor, a push button is provided at the first floor which will be considered an up button and a push button is provided at the third floor which will be considered a down button. The push buttons act through floor relays to register calls. The push buttons in the car will hereinafter be termed car buttons while those at the floors will hereinafter be termed landing buttons.

Mechanism actuated in accordance with car movement is utilized, this mechanism being diagrammatically illustrated as a floor controller of the form disclosed in the patent to Dunn No. 2,032,475 granted March 3, 1936. This floor controller is driven preferably by means of a tape extending from the car to the counterweight and having teeth thereon for engaging teeth on the selector driving wheel. It comprises a crosshead which is driven by a screw. This screw is driven through beveled gears by the shaft on which the driving wheel is mounted, thus moving the crosshead in accordance with movement of the car. The crosshead carries mechanism for controlling the direction of car travel and mechanism for controlling the picking up and cancelling of the calls. Mechanism is also provided on the floor controller for causing slow down and stopping of the car.

Reference may now be had to Figures 2 and 3. The control system is there illustrated as a variable voltage control system, considerably simplified as compared with control systems utilized in commercial installations. It is to be understood that in applying the invention to control systems used commercially many changes may be made, especially in adapting the invention to the more comprehensive circuits and to control features and apparatus not here shown. The circuits of Figure 2 are principally control circuits while those of Figure 3 are principally the generator field winding and armature circuits.

The driving motor for the generator and exciter and various control circuits therefor are not shown. The armature of the generator is designated GA, its series field winding SRF, its separately excited or direction field winding SEF, and its self-excited field winding SLF. SR1, SR2, SR3 and SR4 are rectifiers in the circuit for field winding SLF. These rectifiers are arranged in a bridge circuit for current flow in the direction of their arrows, with the field winding adapted for connection across the diagonal of the bridge. Also FU is a fuse in the circuit for field winding SLF. The armature of the hoisting motor is designated MA and its separately excited field winding is designated MF. The exciter armature is designated EA, its series field winding ESR and its self-excited field winding ESF. The field winding circuits and certain of the control circuits are supplied with current from the exciter. The exciter feed lines are designated EX+ and EX— and extend from Figure 2 into Figure 3. Feed line EX— is grounded at GR. The floor relay and other control circuits are supplied from separate lines having voltage applied thereto so long as the elevator is in service. These latter supply lines are designated + and — and, for example where the generator driving motor is a polyphase alternating current motor, may be supplied with direct current derived through a rectifier from the alternating current supply mains.

The uplanding buttons are designated UB, the down landing buttons are designated DB and the car buttons are designated CB. These letters are preceded by numerals indicating the floors for which the buttons are provided. The push buttons act through floor relays designated first by the numeral corresponding to the floor for which the relay is provided and then by the letters CF, UF or DF in accordance with whether the floor relay is for a car button, an uphall button or a down hall button. Each of the floor relays is provided with an operating coil and a release coil. The floor relay when operated is latched in operated condition thereby registering the call. When the call is answered, the release coil is energized to release the latch, thereby cancelling the call.

The picking up and cancelling of the calls is effected through brushes carried by the crosshead of the floor controller and cooperating stationary contacts. There is a stationary contact for each of the car buttons, these contacts being arranged on the floor controller in a vertical column in accordance with the floors for which they are provided and being subject to contacts of the car button floor relays for the corresponding floors. These contacts, designated CS preceded by a numeral corresponding to the floor for which the contact is provided, are adapted to be engaged by the up car call pick up brush UCPB, the down car call pick up brush DCPB and the car call cancelling brush CCB. There is a stationary contact for each of the down landing buttons, these contacts also being arranged in a vertical column in accordance with the floors for which they are provided and being subject to the contacts for the down landing button floor relays for the corresponding floors. These contacts, designated DS preceded by the numeral corresponding to the floor for which the contact is provided, are adapted to be engaged by the down landing call pick up brush DLPB and down landing call cancelling brush DLCB. There is a stationary contact for each of the up landing buttons, these contacts also being arranged in a vertical column in accordance with the floors for which they are provided and being subject to the contacts for the up landing button floor relays for corresponding floors. These contacts, designated US preceded by the numeral corresponding to the floor for which the contact is provided, are adapted to be engaged by the up landing call pick up brush ULPB and up landing call cancelling brush ULCB. The call cancelling brushes are in engagement with their stationary contacts when the car is opposite the floor for which the stationary contacts are provided, whereas the call pick up brushes engage these contacts in advance of the arrival of the car in the direction for which the brush is provided.

The push buttons also act through their floor relays in cooperation with direction mechanism on the floor controller to control the direction of car travel. This direction mechanism comprises a plurality of hook switches HS, one for each floor, these hook switches being differentiated as to floors by numerals corresponding to the floors preceding the letters. The hook switches are arranged in a vertical column and are adapted to be engaged by a three section direction cam designated DRC. Insulating rollers IR are carried by the direction cam for lifting the hook switches off the cam surface.

Referring back to Figure 1, the floor controller slow down and stopping mechanism comprises pawls carried by the crosshead and biased to extended position for engaging stopping lugs positioned on upright members of the floor controller. There are two pawls one designated 11 for up car travel and the other designated 12 for down car travel. Up stopping lugs 13 for engagement by the up pawl are provided for the second and third floors while down stopping lugs 14 for engagement by the down pawl are provided for the second and first floors. A magnet is provided for controlling the extension and retraction of the pawls. This magnet, which will hereinafter be termed pawl magnet and designated PM, is carried by the crosshead. The pawl magnet when energized retracts the pawls from the stopping collars and closes selector switches SLS1 and SLS2 carried by the crosshead. When a call is picked up, the pawl magnet is deenergized, permitting the pawls to be extended for cooperation with the stopping lugs. As the crosshead continues its movement, the pawl for the direction of car travel engages the stopping lug for the floor for which the call has been picked up, causing the opening of selector switches SLS1 and SLS2 in sequence which causes the car to be slowed down and brought to a stop at that floor.

Referring again to Figures 2 and 3, the electromagnetic control switches employed in the system illustrated are designated as follows:

D—Down direction switch
E—Speed switch
K—Motor generator set starting switch
MC—Minimum current field relay
NT—Time relay
SS—Stop switch
U—Up direction switch
VR—Voltage relay
XD—Down direction relay
XU—Up direction relay.

Throughout the description which follows, these letters will be applied to the coils of the above designated switches. Also, with reference numerals appended thereto they will be applied to the contacts of these switches. The release coil of the electromechanical brake is similarly designated BR. The circuits are shown in "straight" or "across-the-line" form in which the coils and contacts of the various switches are separated in such manner as to render the circuits as simple and direct as possible. The relationship of the coils and contacts may be seen from Figures 2s and 3s where the switches are arranged in alphabetical order and where the coils and contacts are positioned on spindles in horizontal alignment with the corresponding elements of the wiring diagram. The brake coil BR and the coil PM of the pawl magnet are included on the spindle sheets. The electromagnetic switches are illustrated in deenergized condition, switch SS being of the latching type and being shown in reset condition.

Power mechanism may be provided for operating the hoistway doors and car door or for operating only the car door. Such mechanism and the circuits therefor have not been illustrated. The contacts operated by the car door when it reaches closed position are designated GC. The hoistway door contacts are designated DC. Mechanism for effecting the locking and unlocking of the hoistway doors is not shown and as an aid in simplifying the circuits it will be assumed that the door contacts are closed when the corresponding doors are closed. ES is the emergency stop switch in the elevator car. USL and DSL are respectively the up slow down limit switch and the down slow down limit switch, UL and DL are respectively the up stop limit switch and the down stop limit switch and FUL and FDL are respectively the final up limit switch and the final down limit switch. Resistances are designated generally by the letter R.

The circuits are illustrated for the condition with the car standing at the first floor and with the first floor hoistway door and car door closed. It will be assumed that the time interval of time relay NT has expired.

Assume now that an intending passenger at the second floor presses up second floor landing button 2UB. This causes the up second floor relay 2UF to latch in operated condition. Upon operating, this relay engages contacts 2UF2 which completes a circuit through contacts NT2, resistance RU2, contacts 2FU2, hook switch 2HS, upper section of direction cam DRC, contacts XD4 and contacts D2 for the coil of up direction relay XU. Relay XU, upon operation, separates interlock contacts XU5. It also engages contacts XU1 to complete a circuit for the coil of motor generator set starting switch K. The operation of switch K starts the motor generator set in operation. The exciter comes up to speed, applying voltage to motor field winding MF. As the motor field comes up to full value, minimum current field relay MC operates. Relay MC engages contacts MC1 to complete a circuit through limit switches FUL and FDL, contacts MC1, emergency switch ES, car door contacts GC, contacts XU7, contacts NT3 and contacts VR1 for the operating coil of stop switch SS. Switch SS operates to engage contacts SS2, completing a circuit for the coil of pawl magnet PM. The pawl magnet acts to retract the pawls, disengaging down pawl 12 (Figure 1) from the first floor stopping collar 14 with the result that the selector slow down and stop switches SLS1 and SLS2 engage. The engagement of switch SLS2 completes a circuit through limit switches FUL and FDL, contacts MC1, switch ES, car door contacts GC, hoistway door contacts DC in series relation, switch SLS2, contacts XU6, contacts D4 and limit switch UL for the coil of up direction switch U. Switch U, upon operation, separates interlock contacts U3 and U5 and engages contacts U2 to render brushes UCPB and ULPB alive for up car travel. It also engages contacts U1 to complete a circuit for the coil of time relay NT. Relay NT, upon operation, separates contacts NT2 but without effect as they are by-passed for contacts XU2, and separates contacts NT3 without effect as stop switch SS is latched in operated condition. Switch U also engages contacts U8 and U9 to complete a circuit for generator direction field winding SEF through resistance RS. It also engages contacts U7 to complete a circuit for the brake release coil BR. This causes the brake to be released and, with the energization of field winding SEF, sufficient voltage is generated by the generator armature GA for application to motor armature MA to effect the starting of the car. The direction of current flow in field winding SEF causes the polarity of the voltage generated to be such as to cause the car to start in the up direction.

Switch U, upon operation, also separates contacts U10 and U13 to disconnect the generator self-excited field winding SLF from across the generator armature and engages contacts U11 and U12 to connect winding SLF in a different circuit across the generator armature and series field winding. This circuit is from the left hand side of the generator armature through fuse FU, resistance RSC, rectifier SR1, contacts U11, self-excited field winding SLF, contacts U12, rectifier SR4, series field winding SRF, to the right hand side of the generator armature. The polarity of this connection is such that the excitation of the generator due to the self-excited field winding assists that due to the direction field winding. The slope of the resistance line of the self-excited field winding circuit with resistance RSC included is greater than that of the magnetization curve of the generator field, usually referred to as the resistance line being outside the magnetization curve. When the separate excitation of the generator is established, the slope of the resistance line is not changed but may be regarded as in effect shifted to a point inside the curve. The point at which the shifted line crosses the magnetization curve and thus the voltage to which the generator builds up is determined by the amount of separate excitation.

Switch U, upon operation, also engages contacts U6 which completes a circuit through switch USL, contacts U6 and switch SLS1 for the coil of speed of switch E. Switch E, upon operation, engages contacts E1 to short circuit a portion of resistance RS in circuit with direction field winding SEF, and engages contacts E2 to short circuit a portion of resistance RSC in circuit with self-excited field winding SLF. The short circuit of the portion of resistance RS acts in effect to shift the resistance line of the self-excited field winding to a point farther inside the magnetization curve while the short circuit of the portion of resistance RSC acts to decrease the slope of the resistance line. Thus the resistance line is caused in effect to cross the magnetization curve at a higher point on this curve such as will result in the generator voltage building up to full value. As a result the elevator motor is brought up to full speed.

Switch E, upon operation, also engages contacts E3 connecting the coil of voltage relay VR across the generator armature through resistance RVR. As the generator voltage approaches full value, relay VR operates to engage contacts VR2 and VR3 establishing a direct connection for the generator self-excited field winding SLF across the generator armature and series field winding, by-passing contacts U11 and U12 of the up direction switch and rectifiers SR1 and SR4.

As the car approaches the second floor, brush ULPB engages second floor stationary contact 2US which completes a circuit through the release coil of stop switch SS, contacts U2, brush ULPB, contact 2US, contacts 2UF1 and the release coil of the up second floor relay 2UF. The current which flows in this circuit is not sufficient to effect the release of the up second floor relay but the release coil of stop switch SS is energized sufficiently to release the latch, permitting this switch to drop out. At substantially the same time that brush ULPB engages contact 2US, the up insulating roller IR engages and lifts hook switch 2HS off the upper section of direction cam DRC, breaking the circuit for the coil of up direction relay XU which drops out. Contacts U4 maintain the circuit for the coil of up direction switch U after contacts XU5 separate. Upon dropping out switch SS separates contacts SS2 to deenergize the pawl magnet, thereby effecting the release of the pawls for cooperation with the stopping collars.

Upon continued upward movement of the car, up pawl 11 engages the second floor stop collar 13 which with further movement of the car effects the opening of selector switch SLS1. The opening of switch SLS1 breaks the circuit for the coil of speed switch E. Switch E drops out, separating contacts E3 to break the circuit of coil of voltage relay VR. Relay VR, in turn, drops out to separate contacts VR2 and VR3, removing the by-pass for rectifiers SR1 and SR4 and contacts U11 and U12 in the circuit for the generator self-excited field winding SLF. Switch E also separates contacts E1 to remove the short circuit for the portion of resistance RS in circuit with generator direction field winding SEF and separates contacts E2 to remove the short circuit for the portion of resistance RSC in circuit with the generator self-excited field winding SLF. The removal of the short circuit for resistance RS reduces the separate excitation of the generator while the removal of the short circuit for resistance RSC increases the slope of the resistance line of the self-excited field winding circuit. This results in the decrease of the voltage of the generator and thus in the speed of the car.

As the car arrives at the second floor, selector switch SLS2 opens, breaking the circuit for the coil of up direction switch U. Switch U, upon dropping out, separates contacts U8 and U9 to discontinue excitation of the generator direction field winding and separates contacts U7 to break the circuit for the brake release coil to apply the brake, bringing the car to a stop at the second floor. Switch U, also separates contacts U11 and U12 and engages contacts U10 and U13 to reconnect the generator self-excited field winding SLF across the generator armature with reverse polarity so as to counteract the effect of residual flux of the generator field.

As the car arrives at the floor, brush ULCB engages contact 2US completing another circuit through resistance RC and contacts XD5 for the release coil of up second floor relay 2UF. This causes sufficient current to be supplied to this coil to release the floor relay, thereby automatically cancelling the call.

Switch U, in dropping out, also separates contacts U1 to deenergize the coil of time relay NT which upon the expiration of a certain time interval separates contacts NT1 to break the circuit for the coil of switch K, shutting down the motor generator set.

Response is had to all calls that are registered. As regards calls registered on car button floor relays, these calls are answered as the car reaches the floors for which the relays are provided, regardless of the direction of car travel, brush UCPB being effective during up car travel and brush DCPB being effective during down car travel for cooperation with stationary contacts CS to pick up the calls. As regards calls registered on landing button floor relays, however, up landing calls are answered during up car travel as the car reaches the floors for which such calls are registered and down landing calls are answered during down car travel as the car reaches the floors for which such calls are registered, brush ULPB being effective for up car travel for cooperation with stationary contacts US and brush DLPB being effective for down car travel for cooperation with stationary contacts DS. If the highest call is a down landing call, this call is answered during upward car travel. The engagement of the up insulating roller IR with the hook switch for the floor for which such call is registered breaks the circuit for the coil of up direction relay XU and relay XU in turn engages contacts XU3 to complete a circuit for the release coil of stop switch SS, causing the car to be slowed down and brought to a stop at the floor. The down call is automatically cancelled as the car arrives at the floor owing to the fact that brush DLCB is rendered alive by engagement of contacts XU4. Similarly, if the lowest call is an up landing call this call is answered during down car travel. The engagement of the down insulating roller IR with the hook switch for the floor for which such call is registered breaks the circuit for the coil of down direction relay XD and relay XD in turn engages contacts XD2 to complete a circuit for the release coil of stop switch SS, causing the car to be slowed down and brought to a stop at the floor. The up call is automatically cancelled as the car arrives at the floor owing to the fact that brush ULCB is rendered alive by engagement of contacts XD5. The car is automatically started after each stop so long as calls remain to be responded to. The direction relays XU and XD act to maintain the car set for travel in the same direction after each stop so long as calls in that direction from the car remain to be responded to at the time the call is picked up. Contacts NT2 act upon the farthest stop in a given direction to provide time for an entering passenger to press a car button for his desired destination and thus determine the direction of car travel. It is believed that these operations will be understood in view of previous description.

Rectifiers SR1, SR2, SR3 and SR4 in the generator self-excited field winding circuit act to insure a given polarity of self excitation. Reversing switch contacts U11, U12, D11 and D12 in this circuit enable the rectifiers to perform this function for each direction of car travel. With this arrangement and a series field winding of a strength usually used in elevator systems, generator voltage of a polarity for operation of the car in a direction opposite to that for which it is set for travel cannot be built up sufficiently to cause the car to move in such opposite direction. With current flow through the rectifiers in the direction of their arrows, for up direction of car travel contacts U11 and U12 cause current flow through field winding SLF from left to right, while for down direction of car travel contacts D11 and D12 cause current flow through this winding from right to left. Assuming for example that for up direction of car travel the left hand side of the generator armature is positive, then current flows through rectifier SR1, contacts U11, field winding SLF, contacts U12 and rectifier SR4. With the up direction switch operated, should for any reason the generator voltage tend to build up of a polarity opposite to that desired, as for example where under overhauling load conditions the car door is opened and reclosed so as to enable the series field excitation to overcome the separate excitation when reestablished, rectifiers SR4 and SR1 would block the flow of current through the self-excited field winding from right to left. However current would continue to flow from left to right through the self-excited winding by way of rectifiers SR2 and SR3, the circuit being from the right hand side of series field winding SRF through rectifier SR2, contacts U11, field winding SLF, contacts U12 and rectifier SR3, to the left hand side of the generator armature, thereby causing the self excitation of the generator to continue to be of the proper polarity for operation of the car in the up direction. Thus, instead of building up the generator voltage for operation of the car in the down direction, the self excitation opposes the series excitation, the self-excited field acting as a demagnetizing field to reduce the generator excitation to a net value which is not strong enough to cause operation of the car in the down direction. Similarly with the down direction switch operated so that current flow in the self-excited field winding would normally be from the right hand side of series field winding SRF through rectifier SR2, contacts D11, field winding SLF, contacts D12 and rectifier SR3, to the left hand side of the generator armature, should for any reason the generator voltage tend to build up of a polarity for operation of the car in the up direction, rectifiers SR3 and SR2 would block the flow of current through the self-excited field winding in the opposite direction while rectifiers SR1 and SR4 would pass current. As a result current would continue to flow through the self-excited field winding in the same direction, the circuit being from the left hand side of the generator armature through rectifier SR1, contacts D11, field winding SLF, contacts D12 and rectifier SR4, to the right hand side of series field winding SRF, thereby causing self excitation of the generator of the proper polarity for down operation with the result that the self-excitation opposes the series excitation and prevents the generator voltage building up of a polarity for operation of the car in the up direction.

The protection is not destroyed by the failure of one or more of the rectifiers. Assume for example that rectifier SR1 becomes short circuited. So long as current flow is in the direction of the arrow of this rectifier, the same operation is had as if the rectifier were not short circuited. With current flow in the opposite direction the self-excited field winding is short circuited, causing the blowing of fuse FU the short circuit being through rectifier SR2 and the short circuit across rectifier SR1. As a result, the self-excited field winding is disconnected, preventing the generator voltage building up by self excitation. Should both rectifiers SR1 and SR2 become short circuited, the fuse blows to disconnect the self-excited field winding circuit as soon as current flows in either direction. Similar protection is afforded upon the short circuiting of either or both of rectifiers SR3 and SR4. Also should an open circuit occur at a rectifier, while the self-excited field winding would be rendered ineffective for one direction of operation, still current flow through the self-excited field winding in an opposite direction to that desired would remain effectively blocked.

When the generator voltage is at or near full value, the proper generator polarity is definitely established so that the protective circuit may be rendered ineffective. This is done by voltage relay VR which short circuits the rectifiers and direction switch contacts in the self-excited field winding circuit as the generator voltage approaches full value. However, in starting the car and during retardation when conditions might arise conducive to improper polarity of generator voltage, voltage relay VR is not operated so that the protective circuit is effective. Inasmuch as with this arrangement the rectifiers are not subject to the high value of current which flows during full speed operation and as the periods they are effective, namely during acceleration and retardation, are relatively short, the rectifiers are not subject to excessive heating. Furthermore, the longer periods that the rectifiers are ineffective provide ample time for cooling. As a result the rectifiers employed may be smaller than would be used if they were also effective during full speed operation. To give immediate notice of any failure of relay VR to drop out, contacts VR1 in the circuit with the operating coil of switch SS act whenever such failure occurs to prevent the restarting of the car.

If it be preferred to have the rectifiers effective at all times that the car is operating, relay VR may be omitted and larger rectifiers used. An arrangement omitting relay VR is illustrated in Figure 4. This figure is similar to Figure 3, being directed to the generator field winding and armature circuits. It is to be understood that with relay VR omitted, contacts VR1 would not be present in Figure 2.

For installations with a series field winding which is overcompounded during slow down under overhauling load conditions, it has been found that connecting the self-excited field winding to the generator armature through the series field winding aids in obviating undue length of the slow down period. This connection is employed for example in the circuits of Figure 3. However, the self-excited field winding connection may be made directly across the generator armature where such overcompounding during slow down under overhauling load conditions does not exist and also in cases where such overcompounding does exist with the length of the slow down period shortened in other ways. This connection is employed for example in the circuits of Figure 4.

It is to be noted that the protective circuit prevents the generator building up a voltage by self excitation of a polarity opposite that desired, in the arrangements illustrated opposite to that dictated by the direction switches. It also acts, should the generator polarity become opposite to that desired, to provide an excitation to oppose this voltage, thereby building down this opposite generator voltage to a negligible value. Other protective circuit arrangements may be provided, as where the protective circuit prevents building up a voltage by self excitation of opposite polarity to that desired but does not act to provide self excitation to oppose a generator voltage of incorrect polarity. The rectifiers serve both to pass current for the self-excited field winding to give the proper polarity of self excitation and to block the flow of current in the opposite direction. However, the rectifiers may be arranged to provide only a blocking function. Still other protective circuit arrangements employing rectifiers may be provided. However, some of these modifications do not embody the safety feature had with the arrangements of Figures 3 and 4 when a rectifier becomes short circuited and/or open circuited. The rectifiers have been conventionally illustrated and it is to be understood that various types may be used, such as copper oxide, selenium or electron tube rectifiers.

It is not intended to enumerate all of the variations which may be made. Furthermore it is contemplated that the invention may be used in connection with circuits and apparatus different from those specifically described. Also the invention is applicable to other forms of elevator control and to other applications for generators utilizing self-excited field windings. Although described for a generator having the resistance line of its self-excited field winding circuit of a slope greater than that of the magnetization curve, the invention is equally applicable where the slope of this line is lower than that of the magnetization curve. The control system illustrated is considerably simplified but it is understood that many elevator control systems are very complex and admit of many variations. In applying the invention to such systems, variations may be made and many refinements of control may be employed. Therefore it is intended that all matter contained in the above description or shown in the accompanying drawings shall be interpreted as illustrative and not in a limiting sense.

What is claimed is:

1. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source for a given polarity of generator excitation; a plurality of unidirectional current conducting means arranged in a bridge connected to said generator armature; and a circuit for connecting said self-excited field winding across the diagonal of said bridge for current flow therein in a direction for said given polarity of generator excitation.

2. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source for a given polarity of generator excitation; a plurality of unidirectional current conducting means arranged in a bridge connected to said generator armature; a circuit for connecting said self-excited field winding across the diagonal of said bridge for current flow therein in a direction for said given polarity of generator excitation; and current responsive means operable upon the short-circuiting of any unidirectional current conducting means and current flow in a direction opposite to that in which such unidirectional current conducting means normally passes current for disconnecting said bridge from said generator.

3. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source; switches in said circuit for controlling the polarity of excitation of said generator by said separately excited field winding; a plurality of rectifiers connected in bridge relationship to said generator; a circuit for connecting said self-excited field winding across the diagonal of said bridge; and switches in said last named circuit for causing the direction of current flow in said self-excited field winding to be for a polarity of generator excitation as dictated by said switches in said circuit for said separately excited field winding.

4. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source; a plurality of rectifiers connected in bridge relationship to said generator armature so as to cause any current flow across the diagonal of said bridge to be in the same direction regardless of the polarity of said generator; a circuit for connecting said self-excited field winding across said diagonal of said bridge; and direction switches for controlling the direction of rotation of said motor, said switches having contacts in said separately excited field winding circuit for determining the polarity of excitation of said generator by said separately excited field winding and having contacts in said diagonal circuit for causing the direction of current flow in said self-excited field winding to be for the same polarity of generator excitation as provided by said separately excited field winding.

5. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source; direction switches for controlling the direction of rotation of said motor, said switches having contacts in said separately excited field winding circuit for determining the polarity of excitation of said generator by said separately excited field winding; and a plurality of rectifiers connected in bridge relationship to said generator armature and additional contacts on said direction switches for connecting said self-excited field winding across the diagonal of said bridge for causing the direction of current flow in said self-excited field winding to be for the same polarity of generator excitation as provided by said separately excited field winding, regardless of the polarity of the voltage of said generator.

6. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source; direction switches for controlling the direction of rotation of said motor, said switches having contacts in said separately excited field winding circuit for determining the polarity of excitation of said generator by said separately excited field winding; a plurality of rectifiers connected in bridge relationship to said generator armature and additional contacts on said direction switches for connecting said self-excited field winding across the diagonal of said bridge for causing the direction of current flow in said self-excited field winding to be for the same polarity of generator excitation as provided by said separately excited field winding, regardless of the polarity of the voltage of said generator; and a fuse in the connection of said bridge to said generator for opening such connection upon the short-circuiting of any of said rectifiers and current flow in a direction opposite to that in which such rectifier normally passes current.

7. In combination; a direct current motor having an armature; a direct current generator for supplying current to said motor, said generator having an armature, a separately excited field winding, a series field winding and a self-excited field winding, said armatures being connected in a loop circuit including said series field winding; a source of direct current for said separately excited field winding; a circuit for connecting said separately excited field winding to said source; direction switches for controlling the direction of rotation of said motor, said switches having contacts in said separately excited field winding circuit for determining the polarity of excitation of said generator by said separately excited field winding; and a plurality of rectifiers connected in bridge relationship across said generator armature and additional contacts on said direction switches for connecting said self-excited field winding across the diagonal of said bridge for causing the direction of current flow in said self-excited field winding to be for the same polarity of generator excitation as provided by said separately excited field winding, regardless of the polarity of the voltage of said generator, the slope of the resistance line of said self-excited field winding circuit being greater than that of the magnetization curve of said generator.

8. In combination; a direct current motor having an armature; a direct current generator for supplying current to said motor, said generator having an armature, a separately excited field winding, a series field winding and a self-excited field winding, said armatures being connected in a loop circuit including said series field winding; a source of direct current for said separately excited field winding; a circuit for connecting said separately excited field winding to said source; direction switches for controlling the direction of rotation of said motor, said switches having contacts in said separately excited field winding circuit for determining the polarity of excitation of said generator by said separately excited field winding; a plurality of rectifiers connected in bridge relationship across said generator armature and additional contacts on said direction switches for connecting said self-excited field winding across the diagonal of said bridge for causing the direction of current flow in said self-excited field winding to be for the same polarity of generator excitation as provided by said separately excited field winding, regardless of the polarity of the voltage of said generator; and further additional contacts on said direction switches for connecting said self-excited field winding across the generator armature for excitation of the generator to oppose the residual flux when the separately excited field winding is disconnected from said source in stopping the motor.

9. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source for exciting said generator to provide a generator voltage of a certain polarity; and a plurality of rectifiers connected in bridge relationship to said generator armature with said self-excited field winding connected across the diagonal of said bridge for assisting said separately excited field winding and said series field winding in exciting said generator so long as said generator voltage is of said certain polarity and for opposing said series field winding in exciting the generator when due to negative load conditions said series field winding reverses the polarity of the generator voltage.

10. In combination; a direct current generator having an armature, a separately excited field winding and a self-excited field winding; a source of direct current for said separately excited field winding; a circuit for connecting said separately excited field winding to said source for exciting the generator; a circuit for connecting said self-excited field winding to said generator armature for assisting said separately excited field winding in exciting the generator; and a circuit for connecting said self-excited field winding to said generator armature for excitation thereof to oppose the residual flux when said separate excitation of said generator is discontinued.

11. In combination; a direct current motor; a direct current generator for supplying current to said motor, said generator having an armature, a separately excited field winding and a self-excited field winding; a source of direct current for said separately excited field winding; a circuit for connecting said separately excited field winding to said source for a given polarity of generator excitation; a circuit for connecting said self-excited field winding to said generator armature for said given polarity of generator excitation; and a circuit for connecting said self-excited field winding to said generator armature for excitation thereof to oppose the residual flux when said separately excited field winding circuit is opened in stopping the motor.

12. In combination; a direct current motor; a direct current generator for supplying current to said motor, said generator having an armature, a separately excited field winding, a series field winding and a self-excited field winding; a source of direct current for said separately excited field winding; a circuit for connecting said separately excited field winding to said source for a given polarity of generator excitation; a plurality of rectifiers connected in bridge relationship to said generator armature with said self-excited field winding connected across the diagonal of said bridge for causing the direction of current flow in said self-excited field winding for said given polarity of generator excitation regardless of the polarity of the voltage of said generator; and a circuit for connecting said self-excited field winding to said generator armature for excitation of the generator to oppose the residual flux when said separately excited field winding circuit is opened in stopping the motor.

ARTHUR WILLARD PAULSON.

REFERENCES CITED

The following references are of record in the file of this patent:

UNITED STATES PATENTS

| Number | Name | Date |
|---|---|---|
| 1,952,936 | Murakami | Mar. 27, 1934 |

FOREIGN PATENTS

| Number | Country | Date |
|---|---|---|
| 578,637 | Germany | June 16, 1933 |